United States Patent Office 2,823,097
Patented Feb. 11, 1958

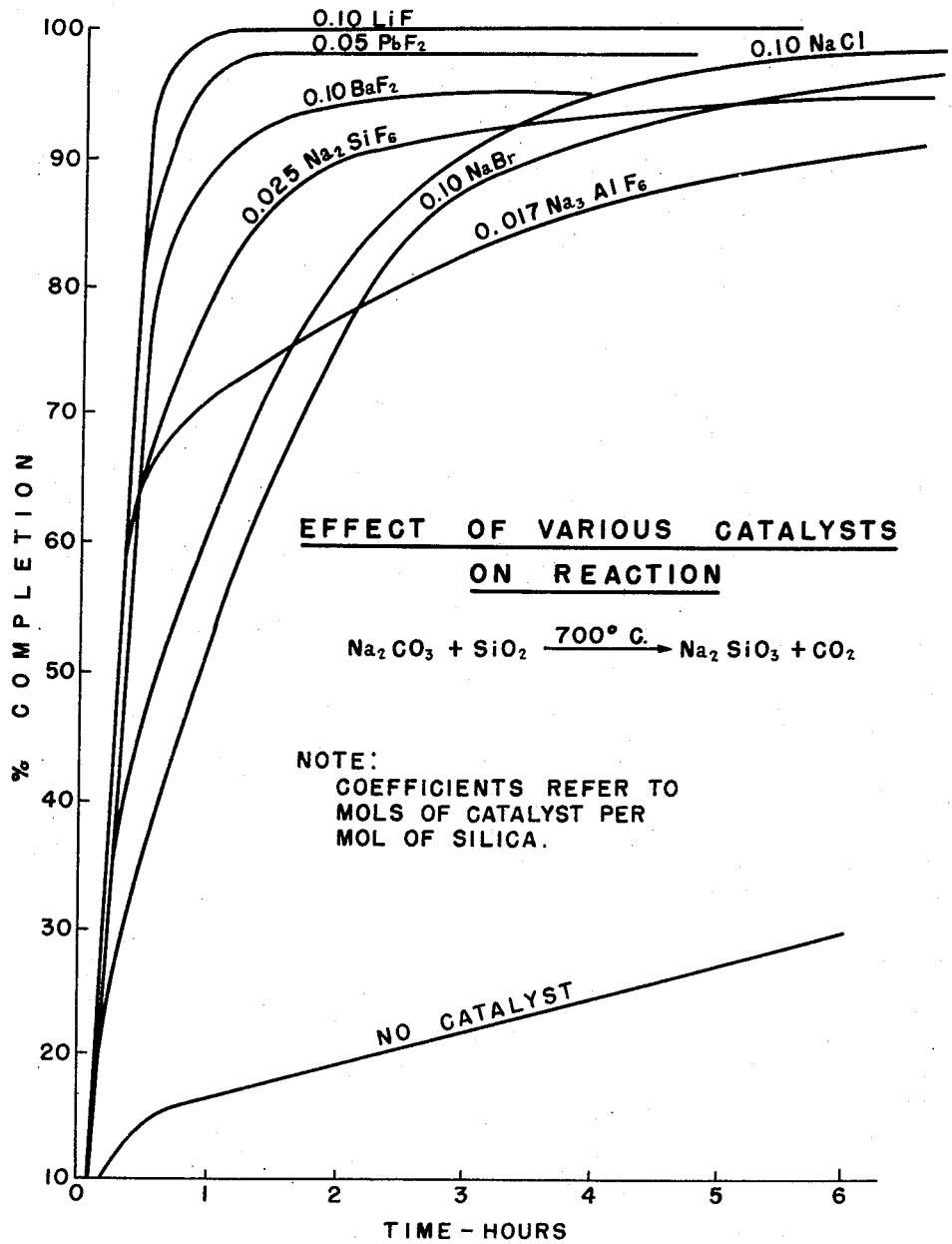

2,823,097
PRODUCTION OF SILICATES

Isadore Mockrin, Philadelphia, Pa., assignor to Pennsalt Chemicals Corporation, a corporation of Pennsylvania Application May 28, 1954, Serial No. 433,031

16 Claims. (Cl. 23—110)

The present invention relates to the manufacture of silicates and more particularly to improvements in the process of manufacturing silicates wherein the silicate is prepared by a substantially dry state reaction between an alkali metal carbonate and silica.

It has heretofore been proposed to react an alkali metal carbonate, such as, sodium carbonate with silica in a substantially dry state to form sodium silicate. The process is particularly desirable from the standpoint of economy since sodium carbonate is substantially less expensive than sodium hydroxide as a source material for the $Na_2O$. The reactions have the objectionable feature, however, that temperatures in excess of 850° C. have been necessary in order to obtain a sufficiently rapid reaction to make the process commercially feasible.

At temperatures much in excess of 850° C. a melt occurs, particularly during the early stages of the reaction, which is corrosive and tends to attack the equipment in which the reaction is being carried out.

In order to avoid any substantial occurrence of melt while carrying out the reaction between the sodium carbonate and the silica, it has been proposed to first heat a mixture of the reactants at a temperature below 850° C. for a time sufficient to volatilize substantial amounts of $CO_2$ and thereafter raise the temperature (still maintaining it at a temperature below which any melt occurs) to increase the rate of reaction. In this manner the reaction can be carried out at sufficiently high temperatures to obtain a reasonable reaction rate while avoiding the occurrence of any substantial amount of melt. This process, however, has the inherent difficulty of requiring careful control in order to be sure that the temperature is not elevated too soon. Also, the high temperatures required add to the expense of obtaining the final product and are generally objectionable.

I have now discovered that reactions between alkali metal carbonates and silica can be carried to substantial completion in a relatively short time at temperatures well below 851° C., which is the melt temperature of sodium carbonate, if a small amount of an inorganic halogen compound is added to the reaction mixture.

By the addition of small amounts of an inorganic halogen compound to the reaction mixture, the reaction can be carried to substantial completion in many instances in less than an hour, at temperatures in the order of 700° C. Inorganic halogen compounds have been found to effectively increase the reaction rate even when present in amounts such that the halogen content is as low as 0.01 gram atom of halogen compound per gram mol of $SiO_2$ present, amounts as low as 0.02 gram atom of halogen per gram mol of $SiO_2$ generally giving excellent results. Increases in the amount of inorganic halogen compound present up to amounts in the order of 0.04–0.05. gram atom of halogen content per gram mol of $SiO_2$ give progressively increasing catalytic effects. However, further increases, though apparently in no way harmful, do not appear to greatly increase further the catalytic effect obtained.

The surprising catalytic effect obtained by the addition of inorganic halogen compounds is well illustrated by the accompanying drawing which contains curves showing the reaction rate at 700° C. for the reactants, sodium carbonate and silica in the presence of small amounts of different catalysts.

The curves, which are the results of actual experiments, are given for the purpose of illustration, and the invention is not limited to the specific inorganic halogen compounds shown. Insofar as I am aware all inorganic halogen compounds, simple and complex, apparently have this catalytic effect. Thus, any of the compounds NaF, NaCl, NaBr, NaI, LiF, KF, KI KCl, $MgF_2$, $CaF_2$ $CaCl_2$, $BaCl_2$, $BaF_2$, $PbF_2$, $AlF_3$, $Na_2SiF_6$, $Na_3AlF_6$, $Na_2FPO_3$, $Na_2TiF_6$ and $K_2ZrF_6$ may be added as a catalyst to catalyze the reaction in place of the specific inorganic halogen compounds shown in the curves referred to. The preferred inorganic halogen compounds, however, are those of the metals sodium, potassium, lithium, lead and calcium.

In practicing the present invention, temperatures as low as 600° C. can be used. However, it is generally preferred to carry out the reaction between the alkali metal carbonate and the $SiO_2$ source material at a temperature within the range of 650° C. to just below the temperature at which any substantial melt may occur. This upper limit would in general be approximately 850° C. at atmospheric pressure during the early stages of the reaction for sodium carbonate. For the other alkali metal carbonates, it would vary with their melting temperatures. However, somewhat higher temperatures may be used if desired as long as no substantial amount of melt occurs, since the presence of an inorganic halide accelerates the reaction even at the higher temperatures. Some mixtures of silica and alkali metal silicates have somewhat lower melting temperatures than the alkali metal carbonate used. In such instances the temperature should be maintained below the melt temperature of the product.

It is generally preferred to use a finely-divided silica, the preferred particle size usually being minus 325 mesh. However, the process can be practiced successfully with silica in particle sizes as high as —65 +115 mesh.

Analysis of the products obtained through the practice of the present invention when sodium carbonate was used indicates that in every case the product is a sodium metasilicate regardless of the ratio of sodium carbonate to silica used.

The rate of the reaction can be varied markedly by varying the ratio of alkali metal carbonate to silicon dioxide. In practicing the present invention, the reactants are generally present in a silica to alkali metal carbonate mol ratio of 1:2 to 3:1. Where there is no objection to having some unreacted silica in the final product, the preferred mol ratio of silica to alkali metal carbonate in the reaction mixture is 1.5:1 to 3:1.

By reacting the sodium metasilicate and excess silica in an aqueous medium under pressure in an autoclave other silicates can readily be prepared where the mol ratio of $SiO_2:Na_2O$ is greater than 1:1. This can be done at a temperature of about 160° C. and pressure of approximately six atmospheres. However, a temperature of about 180° C. and pressure of about eight atmospheres is generally preferred. Gage pressures are referred to.

Also, where excess silica is used the resulting product of sodium metasilicate and silica can be extracted in water, the undissolved silica returned for reaction with further amounts of sodium carbonate and the liquor containing the dissolved sodium metasilicate evaporated to give a sodium metasilicate pentahydrate composition which can then be crystallized.

The rate of reaction can be increased still further by substituting an alkali metal hydroxide for an equivalent part of the alkali metal carbonate. A surprising result obtained by substituting a small amount of an alkali metal hydroxide for an equivalent part of the alkali metal carbonate is that the resulting products give clearer solutions, when dissolved in water, than those prepared from reactants containing no alkali metal hydroxides.

Where the alkali metal carbonate is replaced in part by the alkali metal hydroxide, the alkali metal hydroxide is preferably used in amounts of 0.1 to 0.7 mol alkali metal hydroxide per mol alkali metal carbonate.

Though any of the alkali metal carbonates are suitable for carrying out the reactions of the present invention, sodium carbonate is preferred since the resulting product in such case is anhydrous sodium metasilicate, which has a large and established market. Also, the sodium halides and the potassium halides are preferred as catalysts since no insoluble products will be brought into the reaction product through their use.

In order to better illustrate the practice of the present invention, the following examples are given:

*Example 1*

6.00 parts by weight of sodium carbonate were ground together with 3.41 parts by weight minus 325 mesh silica and 0.58 part sodium bromide. The grinding was continued for about two minutes. The mixture corresponded to the formulation:

$$0.10NaBr + Na_2CO_3 + SiO_2$$

The ground mixture was heated at 700° C. for 6½ hours. The reaction at the end of this time was 96% complete. The product, which was sodium metasilicate, contained the sodium bromide which was originally added to the reactants.

*Example 2*

Potassium silicate was prepared by grinding together 6.48 parts potassium carbonate, 2.82 parts silica and 0.70 part calcium fluoride, and reacted in the same manner as described in Example 1. The reaction mixture corresponded to the formulation:

$$0.19CaF_2 + K_2CO_3 + SiO_2$$

The reaction was carried out at 700° C. and checked periodically to determine the degree of completion. After 1½ hours' heating at 700° C. the reaction was found to be 55% complete. After 2½ hours' heating the reaction was 74% complete and after 4½ hours, the reaction was 85% complete.

*Example 3*

Sodium metasilicate was prepared by grinding together 6.24 parts by weight sodium carbonate, 3.54 parts by weight silica and 0.21 part by weight cryolite ($Na_3AlF_6$). The reaction mixture corresponded to the formulation:

$$0.017Na_3AlF_6 + Na_2CO_3 + SiO_2$$

The reaction mixture was heated in the same manner as in the above examples.

*Example 4*

Sodium metasilicate was prepared in a manner similar to that of Example 1 except that the reaction mixture consisted of 5.89 parts by weight sodium carbonate, 3.53 parts by weight silica, 0.34 part by weight sodium chloride and 0.23 part by weight sodium hydroxide. The reaction mixture corresponded to the following formulation:

$$0.10NaCl + 0.10NaOH + 0.95Na_2CO_3 + SiO_2$$

The reaction was checked periodically to determine the degree of completion. The reaction was found to be 95% complete after 1½ hours' heating at 700° C. and 100% complete after 3½ hours' heating. On adding the reaction mixture to water a clear solution was obtained with a slight amount of insoluble readily settling out.

*Example 5*

5.86 parts by weight sodium carbonate, 3.31 parts by weight minus 325 mesh silica and 0.83 part by weight sodium iodide were ground together for about two minutes. The mixture corresponded to the formulation:

$$0.10NaI + Na_2CO_3 + SiO_2$$

The mixture was heated at about 700° C., the reaction being periodically checked to determine the degree of completion. After ½ hour the reaction was 57% complete and after 2½ hours' heating it was 91% complete. The reaction product was sodium metasilicate.

As previously stated, any of the inorganic halogen compounds can be used as catalysts and any of the alkali metal carbonates may be employed together with a suitable source of $SiO_2$. Reactions using these materials are carried out in the same manner as in the above examples.

The catalytic effect of inorganic halogen compounds on dry state reactions between an alkali metal carbonate and silica is substantially greater than any effect of these compounds on reactions between alkali metal carbonates and other metal oxides, such as, aluminum oxide, tin dioxide, titanium dioxide, etc. As a result, the catalyzed dry state reactions between an alkali metal carbonate and the $SiO_2$ content of an $SiO_2$ source material, where the $SiO_2$ is mechanically held, provides a simple method of separating the $SiO_2$ in the $SiO_2$ source material from other metal oxides that may be present.

This separation of the metal oxides from the combined silica is preferably accomplished in accordance with the present invention by grinding the naturally occurring raw material into a small particle size and then blending with an alkali metal carbonate and a small amount of an inorganic halogen compound. The mixture is heated to a temperature of above 600° C. but below that at which any substantial melt occurs. The resulting product is leached by water to dissolve out the alkali metal silicate formed leaving the metal oxide undissolved.

Having thus described my invention, I claim:

1. In the preparation of alkali metal silicates, the process which comprises preparing a mixture of an alkali metal carbonate and silicon dioxide to which an inorganic halogen compound has been added, said inorganic halogen compound being added in amount at least sufficient to produce a substantial increase in the rate of reaction of said alkali metal carbonate with said silicon dioxide, and heating said mixture in a substantially dry state to a temperature of from 600° C. to a temperature below that at which any appreciable melt occurs.

2. In the preparation of alkali metal silicates, the process comprising heating a mixture of an alkali metal carbonate and silicon dioxide in which the mol ratio of silicon dioxide to alkali metal carbonate is within the range of from 1:2 to 3:1, to which an inorganic halogen compound has been added in amount sufficient to produce a substantial increase in the rate of reaction of said alkali metal carbonate with said silicon dioxide, in a substantially dry state to a temperature of from 600° C. to a temperature below that at which any appreciable melt occurs.

3. In the preparation of alkali metal silicates, the process comprising heating in a substantially dry state a mixture containing an alkali metal carbonate, silicon dioxide and an inorganic halogen compound, in which the mol ratio of silicon dioxide to alkali metal carbonate is within the range of from 1:2 to 3:1 and the said inorganic halogen compound is present in an amount of at least 0.02 gram atom of halogen per gram mol of silicon dioxide, to a temperature of from 600° C. to a temperature below that at which any appreciable melt occurs.

4. The process of claim 2, in which said halogen compound is a compound of a metal of the group consisting of sodium, potassium, lithium, lead and calcium.

5. The process of claim 2, in which said inorganic halogen compound is a chlorine compound.

6. The process of claim 3, in which said inorganic halogen compound is a chlorine compound.

7. In the preparation of alkali metal silicates, the process comprising heating a mixture of an alkali metal carbonate and silicon dioxide in which the mol ratio of silicon dioxide to alkali metal carbonate is within the range of from 1:2 to 3:1, in the presence of an inorganic fluorine compound, in amount sufficient to produce a substantial increase in the rate of reaction of said alkali metal carbonate with said silicon dioxide, in a substantially dry state to a temperature of from 600° C. to a temperature below that at which any appreciable melt occurs.

8. In the preparation of alkali metal silicates, the process comprising heating a mixture of an alkali metal carbonate and silicon dioxide in which the mol ratio of silicon dioxide to alkali metal carbonate is within the range of from 1:2 to 3:1, in the presence of inorganic bromine compound, in amount sufficient to produce a substantial increase in the rate of reaction of said alkali metal carbonate with said silicon dioxide, in a substantially dry state to a temperature of from 600° C. to a temperature below that at which any appreciable melt occurs.

9. In the preparation of alkali metal silicates, the process comprising heating a mixture of an alkali metal carbonate and silicon dioxide in which the mol ratio of silicon dioxide to alkali metal carbonate is within the range of from 1:2 to 3:1, in the presence of inorganic iodine compound, in amount sufficient to produce a substantial increase in the rate of reaction of said alkali metal carbonate with said silicon dioxide, in a substantially dry state to a temperature of from 600° C. to a temperature below that at which any appreciable melt occurs.

10. The process of claim 2, in which said alkali metal carbonate is selected from the group consisting of the carbonates of sodium, potassium, rubidium and caesium and said temperature is at least 650° C.

11. The process of making sodium metasilicate which comprises heating, in a substantially dry state, a mixture containing sodium carbonate and silicon dioxide to which an inorganic halogen compound has been added in amount at least sufficient to produce a substantial increase in the rate of reaction of said sodium carbonate with said silicon dioxide, to a temperature of from 600° C. to a temperature below that at which any appreciable melt occurs.

12. The process of making sodium metasilicate which comprises heating, in a substantially dry state, a mixture containing sodium carbonate, silicon dioxide and sodium chloride, wherein the mol ratio of silicon dioxide to sodium carbonate is within the range of 1:2 to 3:1, and the said sodium chloride is present in an amount of at least 0.02 gram atom of chlorine per gram mol silicon dioxide, to a temperature of from 650° to 850° C.

13. In the preparation of alkali metal silicates the process comprising heating in a substantially dry state a mixture containing an alkali metal carbonate and silicon dioxide wherein the mol ratio of silicon dioxide to alkali metal carbonate is greater than 1:1, to which inorganic halogen compound has been added in an amount at least sufficient to produce a substantial increase in the reaction rate of said alkali metal carbonate with said silicon dioxide, to a temperature of from 600° C. to a temperature below that at which any appreciable melt occurs, further provided that the resulting reaction product is added to water and heated at a temperature of at least 160° C.

14. In the preparation of sodium metasilicate pentahydrate, the process which comprises heating in a substantially dry state a mixture containing sodium carbonate and silicon dioxide in which the mol ratio of silicon dioxide to sodium carbonate is greater than 1:1, to which inorganic halogen compound has been added in an amount at least sufficient to produce a substantial increase in the reaction rate of said sodium carbonate with said silicon dioxide, to a temperature of from 600° C. to a temperature below that at which any appreciable melt occurs, adding the resulting product to water, removing any undissolved silica and evaporating the remaining solution to give sodium silicate pentahydrate.

15. In the preparation of alkali metal silicates the process which comprises heating, in a substantially dry state, to a temperature of from 600° C. up to a temperature below that at which any appreciable melt occurs, a mixture consisting essentially of (1) an alkali metal carbonate, (2) an alkali metal hydroxide and (3) silicon dioxide, in which the mol ratio of silicon dioxide to the sum of the alkali metal oxide in the alkali metal carbonate and alkali metal hydroxide is from 1:2 to 3:1, and the said alkali metal hydroxide is present in an amount of from 0.1 to 0.7 mol of alkali metal hydroxide per mol of alkali metal carbonate, to which there has been added (4) an inorganic halogen compound, in amount at least sufficient to produce a substantial increase in the reaction rate of said alkali metal carbonate with said silicon dioxide.

16. The method of separating metal oxides from $SiO_2$ with which said oxides occur in a $SiO_2$ source material wherein the $SiO_2$ is mechanically held, comprising adding to said source material, in pulverulent form, (1) an alkali metal carbonate in solid form and in amount such that the mol ratio of silicon dioxide to alkali metal carbonate is 1:2 to 3:1 and (2) an inorganic halogen compound in solid form and in an amount at least sufficient to produce a substantial increase in the reaction rate of said alkali metal carbonate with said $SiO_2$; and heating the resulting mixture to a temperature of from 600° C. up to a temperature below that at which any appreciable fusion occurs.

References Cited in the file of this patent

UNITED STATES PATENTS

| | | |
|---|---|---|
| Re. 21,703 | Burkhart | Feb. 4, 1941 |
| 2,219,646 | Beecher | Oct. 29, 1940 |
| 2,239,880 | Curll | Apr. 29, 1941 |
| 2,357,723 | Beecher et al. | Sept. 5, 1944 |
| 2,374,035 | Nutting | Apr. 17, 1945 |

OTHER REFERENCES

Howarth et al.: "J. of Soc. of Glass Technology," vol. 17, Transactions, 1933, pages 25–49.

Hou: Manufacture of Soda, 2nd ed., 509–11 (1942), Reinhold Publishing Corp., New York, N. Y.